(12) United States Patent
Kim et al.

(10) Patent No.: US 12,141,869 B2
(45) Date of Patent: *Nov. 12, 2024

(54) METHOD AND SYSTEM FOR HIGH FREQUENCY TRADING

(71) Applicant: REBELLIONS INC., Seongnam-si (KR)

(72) Inventors: Hyunsung Kim, Seongnam-si (KR); Sungyeob Yoo, Seongnam-si (KR); Jinwook Oh, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,650

(22) Filed: Oct. 26, 2023

(65) Prior Publication Data
US 2024/0070782 A1 Feb. 29, 2024

Related U.S. Application Data

(63) Continuation of application No. 18/172,251, filed on Feb. 21, 2023, now Pat. No. 11,836,799.

(30) Foreign Application Priority Data

Apr. 7, 2022 (KR) .......................... 10-2022-0043472

(51) Int. Cl.
 *G06Q 40/04* (2012.01)
(52) U.S. Cl.
 CPC .................................... *G06Q 40/04* (2013.01)
(58) Field of Classification Search
 CPC .................................................. G06Q 40/04

(Continued)

(56) References Cited

U.S. PATENT DOCUMENTS

2007/0198397 A1* 8/2007 McGinley ............... H04L 47/36
 705/37
2017/0103457 A1* 4/2017 Acuña-Rohter et al. ...................
 G06Q 40/04

(Continued)

FOREIGN PATENT DOCUMENTS

KR 10-2001-0016454 A 3/2001
WO 2020/075304 A1 4/2020

OTHER PUBLICATIONS

Cartea, Alvaro (2012) "Buy Low Sell High: a High Frequency Trading Perspective," Department of Statistics, University of Toronto, Canada.

(Continued)

*Primary Examiner* — Robert R Niquette
(74) *Attorney, Agent, or Firm* — BROADVIEW IP LAW, PC

(57) ABSTRACT

A method for high frequency trading is provided, which is performed by one or more processors, and includes calculating a latency for a market order for each of a plurality of candidate batch sizes, selecting a batch size from among the plurality of candidate batch sizes based on the calculated latency, generating input data corresponding to the selected batch size using market data for a target item, using a machine learning model, generating prediction data for the target item at a future time point associated with the selected batch size, based on the generated input data, and generating order data for the target item based on the generated prediction data.

20 Claims, 13 Drawing Sheets

(58) Field of Classification Search
USPC .................................................. 705/35–45
See application file for complete search history.

(56) References Cited

U.S. PATENT DOCUMENTS

| | | | |
|---|---|---|---|
| 2018/0232807 A1* | 8/2018 | Crabtree | G06Q 40/04 |
| 2021/0035213 A1* | 2/2021 | Kim | G06N 3/08 |
| 2023/0325922 A1* | 10/2023 | Kim | G06Q 40/04 |

OTHER PUBLICATIONS

Martinez, Diego A. et al. (2021) "Courier: Real-Time Optimal Batch Size Prediction for Latency SLOs in BigDL," ICPE '21, Apr. 19-23, 2021, Virtual Event, France. doi: 10.1145/3427921.3450233.
Office Action for KR 10-2022-0043472 by Korean Intellectual Property Office dated Jul. 22, 2024.

* cited by examiner

METHOD AND SYSTEM FOR HIGH FREQUENCY TRADING

CROSS-REFERENCE TO RELATED APPLICATION

This application is a continuation of U.S. application Ser. No. 18/172,251, filed on Feb. 21, 2023, which claims priority under 35 U.S.C § 119 to Korean Patent Application No. 10-2022-0043472, filed in the Korean Intellectual Property Office on Apr. 7, 2022, the entire contents of which is hereby incorporated by reference.

TECHNICAL FIELD

The present disclosure relates to a method and a system for high frequency trading, and more specifically, to a method and a system for high frequency trading, which generate order data based on prediction data for a target item acquired using a machine learning model.

BACKGROUND

High frequency trading is a method of trading securities such as stocks, bonds, derivatives, and the like with high frequency within a short period of time (e.g., hundreds to thousands of times per second) using minute changes in prices. For the high frequency trading, fast processing speed is very important. In general, the shorter the time it takes to process the trading algorithms based on the input information and output results, the more advantages one can have in trading.

Meanwhile, since the high frequency trading techniques using machine learning models analyze a large amount of data acquired from the market, when predicting the market price of a specific item, the techniques can take more factors into consideration than the factors that can be acquired through existing classical algorithms and influence the accuracy of prediction. However, analyzing a large amount of data using the machine learning model may require a lot of storage spaces and processing resources for the machine learning operation. However, existing processors may not be suitable to support the high frequency trading techniques.

In addition, since the machine learning model requires complex computations on a large amount of data, there can be a latency for a market order when using the machine learning model. Due to this latency, a time gap phenomenon may occur, in which a time point at which prediction data of a stock item is output through the machine learning model is already a time point in the past. For example, if the machine learning model outputs prediction data for the target item at a future time point T1 (T1 is a positive number), due to the latency, the time point at which the prediction data is acquired is T1+n (n is a positive number) and the prediction data is now the data about the past, which can be problematic.

SUMMARY

In order to solve one or more problems (e.g., the problems described above and/or other problems not explicitly described herein), the present disclosure provides a method, a computer program stored in a recording medium, and an apparatus (system) for high frequency trading.

The present disclosure may be implemented in various ways, including a method, an apparatus (system), a computer program stored in a computer-readable storage medium, and/or a non-transitory computer-readable recording medium storing instructions.

A method for high frequency trading performed by one or more processors may include calculating a latency for a market order for each of a plurality of candidate batch sizes, selecting a batch size from among the plurality of candidate batch sizes based on the calculated latency, generating input data corresponding to the selected batch size using market data for a target item, generating, using a machine learning model, prediction data for the target item at a future time point associated with the selected batch size, based on the generated input data, and generating order data for the target item based on the generated prediction data.

In addition, the selecting a batch size may include, for each of a plurality of predetermined future time points, selecting, from among the plurality of candidate batch sizes, the largest candidate batch size of which an end time point of the calculated latency precedes each of the plurality of predetermined future time points.

In addition, the selecting the batch size may include calculating an anticipated profit for each of selected batch sizes for each of the plurality of predetermined future time points, and selecting a batch size having the highest calculated anticipated profit form among selected batch sizes for each of the plurality of predetermined future time points.

The calculating the anticipated profit may include, for each of the plurality of predetermined future time points, calculating an anticipated profit of each of the selected batch sizes based on each of the selected batch sizes, a profit per query, and a computation time of the machine learning model for each of the selected batch sizes.

In addition, the method for high frequency trading may further include transmitting the generated order data to a target stock exchange.

In addition, one or more processors include a field programmable gate array (FPGA) and a dedicated accelerator for the machine learning model. In this case, the calculating the latency may include, for each of the plurality of candidate batch sizes, calculating the latency based on at least one of a data rate, bandwidths of input and output data between the FPGA and the dedicated accelerator, sizes of the input and output data, a computation speed of the machine learning model by the dedicated accelerator, a processing speed of the FPGA, or a busy state of the dedicated accelerator.

In addition, the latency may include a time taken for the market data to b e pre-processed by the FPGA, a time taken for transferring the pre-processed data from the FPGA to the dedicated accelerator, a time taken for a computation of the machine learning model to be completed by the dedicated accelerator, a time taken for a computation result to be transferred from the dedicated accelerator to the FPGA, and a time taken for the order data to be generated based on the computation result by the FPGA.

In addition, the method for high frequency trading may further include acquiring data precision of the input data, and the calculating the latency may include calculating, for each of the plurality of candidate batch sizes, a latency based on the precision of the input data.

In addition, the latency may be calculated based on processing elements that are increased as the precision of the input data is decreased.

In addition, the one or more processors may include first and second dedicated accelerators for processing computation of the machine learning model, and the calculating the latency may include calculating, for each of the plurality of candidate batch sizes, a first latency including a computation time of the first dedicated accelerator and a second latency including a computation time of the second dedicated accelerator, and the selecting the batch size may include selecting, for each of a plurality of predetermined future time points, a largest candidate batch size of which an end time point of a lower latency of the calculated first and second latencies precedes each of the plurality of predetermined future time points.

There is provided a non-transitory computer-readable recording medium storing instructions that, when executed by one or more processors, cause performance of the method for high frequency trading described above.

An information processing system may include a first memory storing one or more instructions, one or more processors configured to, by executing the one or more instructions in the first memory, calculate a latency for a market order for each of a plurality of candidate batch sizes, select a batch size from among the plurality of candidate batch sizes based on the calculated latency, and generate input data corresponding to the selected batch size using market data for a target item, a second memory storing one or more instructions, and a dedicated accelerator for a machine learning model, configured to, by executing the one or more instructions in the second memory, to generate, using a machine learning model, prediction data for the target item at a future time point associated with the selected batch size based on the generated input data, and provide the generated prediction data to the one or more processors. Additionally, the one or more processors may be further configured to generate order data for the target item based on the prediction data provided from the dedicated accelerator.

According to some examples of the present disclosure, by determining the batch size for the input of the machine learning model according to the frequency of currently received or collected stock data, unnecessary computations in the machine learning model can be minimized or prevented, while improving or maintaining the accuracy of the predicted price.

According to some examples of the present disclosure, the input data corresponding to a maximum batch size that can be processed by the machine learning model can be generated within a time period in which the time gap does not occur, and the generated input data can be input to the machine learning model. Accordingly, more accurate prediction data for the target item can be acquired from the machine learning model without an occurrence of a time gap.

According to some examples of the present disclosure, by predicting latency for each of a plurality of candidate batch sizes and selecting a batch size with an end time point of the predicted latency being earlier than a future time point, it is possible to prevent unnecessary computations (e.g., computations that cause time gap) from being performed in the machine learning model.

According to some examples of the present disclosure, using a single machine learning model, it is possible to accurately predict the price of a target item at a plurality of future time points, and based on the predicted results, place an order for securities at a future time point at which the anticipated profits are maximum. Accordingly, the profit on securities trading can be maximized.

According to some examples of the present disclosure, a dedicated accelerator capable of expecting a maximum profit can be selected from among a plurality of dedicated accelerators, and computation using machine learning model can be performed through the selected dedicated accelerator.

In this case, the computation speed can be improved and faster order data can be generated, so that the profit on stock trading may be maximized.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
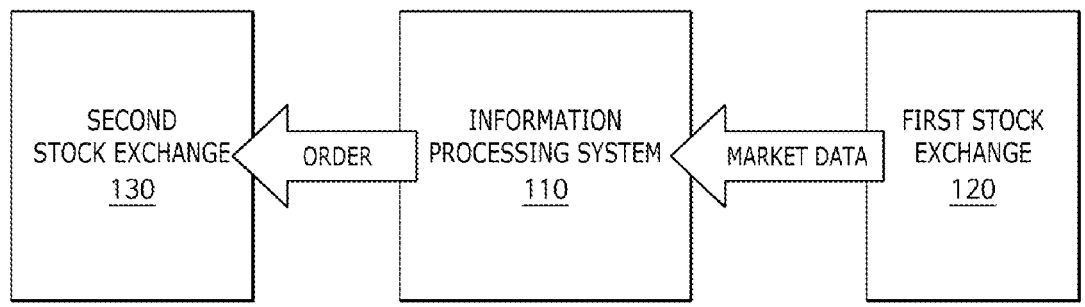
FIG. 1 is a schematic diagram illustrating an example of an operation of an information processing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other. In still another example, the system may refer to a client device for a high frequency trading order.

In addition, terms such as first, second, A, B, (a), (b), and the like used in the following examples are only used to distinguish certain components from other components, and the nature, sequence, order, and the like of the components are not limited by the terms.

In addition, in the following examples, if a certain component is stated as being "connected", "combined" or "coupled" to another component, it is to be understood that there may be yet another intervening component "connected", "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in a plurality of A.

Before describing various examples of the present disclosure, terms used will be described.

In the present disclosure, the term "items" may refer to securities such as stocks, bonds, and derivatives (options, futures, and the like) traded on the securities market, which are classified according to contents and formats. In addition to the individual items, the items may also include index-related items, industrial sector-related items, items for specific commodities (e.g., crude oil, agricultural products, gold, and the like), exchange rate-related items, and the like.

In the present disclosure, a "stock exchange" refers to a venue where securities circulating in at least one country are traded, and where the securities issued by companies or government are listed and traded through brokers. In an embodiment, the stock exchange may include a system of the stock exchange.

In the present disclosure, an "Order Book (OB)" may include a list in which information on buy or sell orders (ask price, quantity, information on buyers or sellers, and the like) of buyers and sellers existing in the securities market is recorded.

In the present disclosure, the "Top of the Book (ToB)" may include information on the highest bid price and lowest bid price.

In the present disclosure, "market data" may include data on items to be traded on the stock exchange. For example, the market data may include order books, announcements, news, and the like of (at least some of) items to be traded on the stock exchange.

In the present disclosure, the "machine learning model" may include any model that is used for inferring an answer to a given input. The machine learning model may include an artificial neural network model including an input layer, a plurality of hidden layers, and an output layer. Each layer may include a plurality of nodes. In addition, in the present disclosure, the machine learning model may refer to an artificial neural network model, and the artificial neural network model may refer to the machine learning model.

In the present disclosure, "instructions" refer to a set of computer readable instructions grouped on the basis of function, which are the components of a computer program and executed by a processor.

Hereinafter, various examples of the present disclosure will be described in detail with reference to the accompanying drawings.

FIG. 1 is a schematic diagram illustrating an operation example of an information processing system 110. The information processing system 110 may predict market conditions at one or more future time points (at time points in near future, for example, after a predetermined time) based on the market data, generate an order for a target item based on the predicted result, and transmit the generated order to a target stock exchange (to a second stock exchange). For the high frequency trading, it is very important to generate and transmit orders at a high speed based on the market data. For this reason, in high frequency trading, even the microsecond latency must be considered, and the information processing system 110 may be colocated close to the server of the target stock exchange (second stock exchange) so as to reduce the latency.

The information processing system 110 may receive the market data from the first stock exchange. In addition, the information processing system 110 may receive the market data from web sites other than the first stock exchange. In this example, the website may be a web site that collects market data generated from one or more exchanges, or may be a web site independently operated by a private company. The market data may include order books, announcements, news, and the like for a plurality of items. The market data may include data on a target item. For example, the market data may include the top of an order book for the target item, a list of (valid) orders for the target item, a response of the first stock exchange to a previous order for the target item, and the like.

The market data may be dynamically received during a unit time. That is, depending on the stock market environments, the size or number of market data received by the information processing system 110 during the unit time may vary. For example, if the stock market fluctuates greatly, the size of the market data received during the unit time or the number of data may increase. That is, if the fluctuation of the stock market increases, the size or number of changes in the order book also increases, and accordingly, the size or number of market data received from the information processing system 110 per unit time may increase.

Although the first stock exchange is illustrated as being one stock exchange in FIG. 1, this is only for convenience of description, and the first stock exchange may include one or more stock exchanges. In addition, although the first stock exchange is illustrated as being a separate exchange from the second stock exchange in FIG. 1, this is also only for convenience of description, and the first stock exchange may include the second stock exchange or the second stock exchange may include the first stock exchange.

The information processing system 110 may analyze the market data and generate an order. For example, the information processing system 110 may analyze the market data and/or the data generated based on the market data so as to predict a market situation (e.g., the price of the target item) at one or more future time points (e.g., after n seconds, where n is a positive real number), and generate an order based on the predicted result. In this case, the process of analyzing the market data and/or the data generated based on the market data may be performed by a machine learning model (e.g., DNN, and the like).

Meanwhile, in high frequency trading, it is very important to analyze the market data quickly and generate orders. However, since the general processor does not have the storage space and computing resources to support the complex and massive computations of the machine learning models, if the machine learning model is driven using the general processor, processing speed and/or efficiency may decrease. Taking this into consideration, the information processing system 110 may include a dedicated accelerator (e.g., a neural processing unit (NPU)) for the machine learning model, in which the dedicated accelerator may be implemented as an integrated circuit (e.g., Application-Specific Integrated Circuit (ASIC)) for the neural processing unit.

Meanwhile, to use the machine learning model, appropriate pre-/post-processing may be required. For example, a process of generating input data of the machine learning model from the market data or generating order data based on data output from the machine learning model may be required. The pre-/post-processing may be continuously changed according to changes in market conditions, regulations, compensation rules for market makers, and the like. If the processor for pre-/post-processing is implemented as an application-specific semiconductor (e.g., ASIC) customized for a specific purpose, if the pre-/post-processing is changed, there is a problem in that a processor for the changed pre-/post-processing has to be prepared again, because redesigning is impossible. Accordingly, processes other than driving the machine learning model may be performed by a processor capable of reprogramming and/or changing designs (e.g., a processor implemented as a field programmable gate array (FPGA)).

As described above, the processor for running the machine learning model may be configured with a dedicated accelerator (e.g., NPU ASIC) to process the computations of the machine learning model quickly and efficiently. In addition, the pre-/post-processing can be flexibly changed in accordance with the continuously changing market conditions using a processor capable of reprogramming or re-designing (e.g., FPGA). In this way, using two or more different processors suitable for processing high frequency trading, implementation of a flexible pre-/post-processing and efficient and fast arithmetic processing of machine learning models can be simultaneously achieved. The internal configuration and data flow of the information processing system 110 will be described below in detail with reference to FIGS. 2 to 4.

Figure 2:
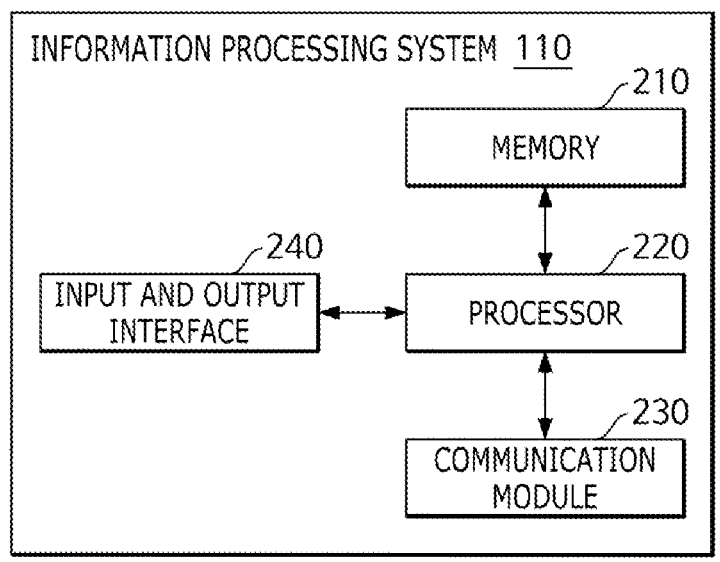
FIG. 2 is a block diagram illustrating an internal configuration of an information processing system.

FIG. 2 is a block diagram illustrating an internal configuration of the information processing system 110. The information processing system 110 may include a memory 210, a processor 220, a communication module 230, and an input and output interface 240. As illustrated in FIG. 2, the information processing system 110 may be configured to communicate information and/or data through a network by using the communication module 230.

The memory 210 may include any non-transitory computer-readable recording medium. The memory 210 may include a permanent mass storage device such as read only memory (ROM), disk drive, solid state drive (SSD), flash memory, and so on. In another example, a non-destructive mass storage device such as ROM, SSD, flash memory, disk drive, and so on may be included in the information processing system 110 as a separate permanent storage device that is distinct from the memory. In addition, an operating system and at least one program code (e.g., code to process computations of a machine learning model installed and driven in the information processing system 110, pre-/post-processing, market order transmission, and so on) may be stored in the memory 210. In FIG. 2, the memory 210 is illustrated as a single memory, but this is only for convenience of description, and the processor 220 may include a plurality of memories.

These software components may be loaded from a computer-readable recording medium separate from the memory 210. Such a separate computer-readable recording medium may include a recording medium directly connectable to the information processing system 110, and may include a computer-readable recording medium such as a floppy drive, a disk, a tape, a DVD/CD-ROM drive, a memory card, and the like, for example. In another example, the software components may be loaded into the memory 210 through the communication module 230 rather than the computer-readable recording medium. For example, at least one program may be loaded into the memory 210 based on a computer program (e.g., a program or the like for analyzing market data, predicting future markets, generating and transmitting orders for securities, and the like) installed by the files provided by the developers, or by a file distribution system that distributes an installation file of an application through a communication module 230.

The processor 220 may be configured to process the commands of the computer program by performing basic arithmetic, logic, and input and output operations. The commands may be provided to a user terminal (not illustrated) or another external system by the memory 210 or the communication module 230. For example, the processor 220 may generate prediction data for a target item based on the input data using the machine learning model, and generate order data based on the generated prediction data. The generated order data may be transmitted to the target stock exchange.

The communication module 230 may provide a configuration or function for the user terminal (not illustrated) and the information processing system 110 to communicate with each other through a network, and may provide a configuration or function for the information processing system 110 to communicate with an external system (e.g., a separate cloud system). For example, control signals, commands, data, and the like provided under the control of the processor 220 of the information processing system 110 may be transmitted to the user terminal and/or the external system through the communication module 230 and the network through the communication module of the user terminal and/or an external system. For example, the external system (stock exchange system) may receive the order data and the like from the information processing system 110.

In addition, the input and output interface 240 of the information processing system 110 may be a means for interfacing with a device (not illustrated) for inputting or outputting, which may be connected to the information processing system 110 or included in the information processing system 110. For example, the input and output interface 240 may include at least one of a PCI express interface and an Ethernet interface. In FIG. 2, the input and output interface 240 is illustrated as a component configured separately from the processor 220, but aspects are not limited thereto, and the input and output interface 240 may be configured to be included in the processor 220. The information processing system 110 may include more components than those illustrated in FIG. 2.

The processor 220 of the information processing system 110 may be configured to manage, process, and/or store the information and/or data received from a plurality of user terminals and/or a plurality of external systems. The processor 220 may receive the market data from the first stock exchange system and the second stock exchange system. The processor 220 may generate prediction data of one or more future time points for the target item based on the received market data, and generate the order data based on the generated prediction data. In FIG. 2, the processor 220 is illustrated as a single processor, but this is only for convenience of description, and the processor 220 may include a plurality of processors. For example, the processor 220 may include one or more processors implemented as an FPGA for pre-/post-processing, and one or more dedicated accelerators implemented as ASICs for the machine learning model. In this case, one or more processors implemented as the FPGA may execute one or more instructions stored in the first memory, and the one or more dedicated accelerators implemented as the ASICs may execute one or more instructions stored in the second memory.

Figure 3:
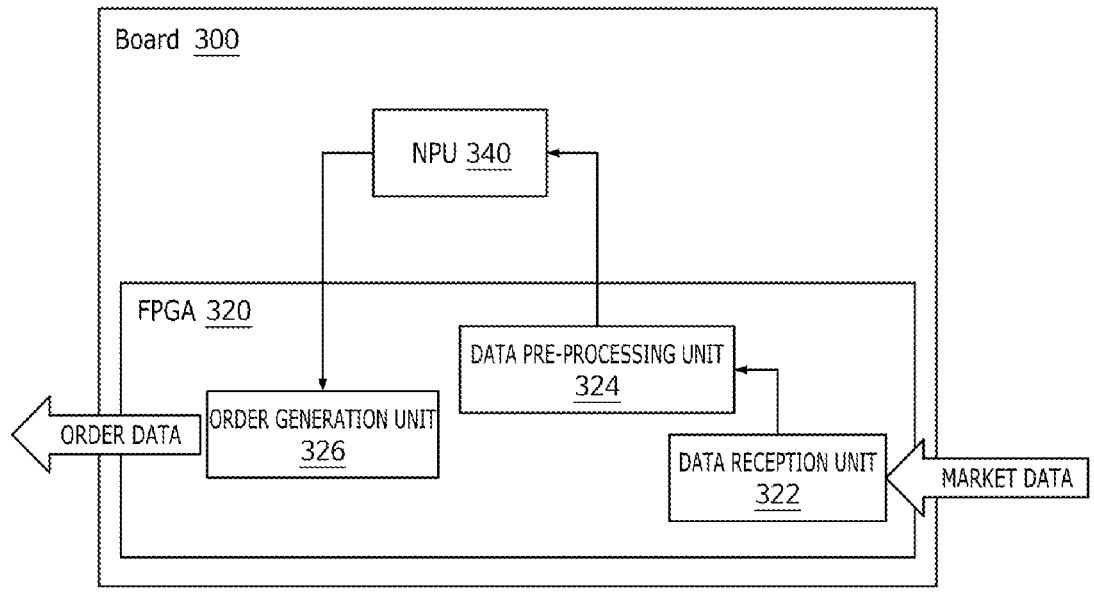
FIG. 3 is a diagram illustrating internal components of a processor.
Figure 4:
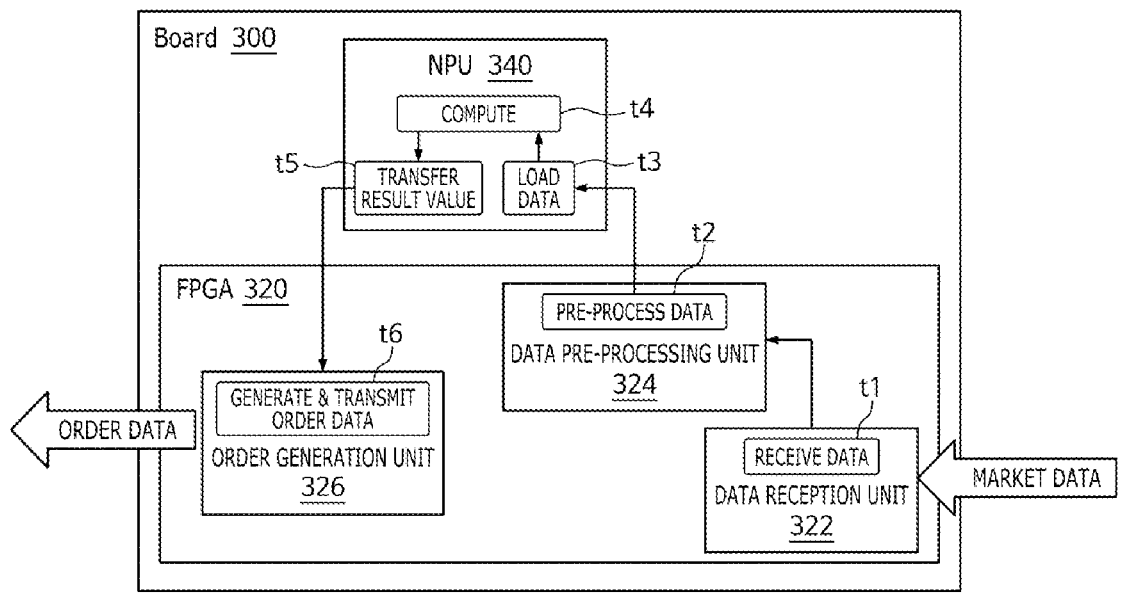
FIG. 4 is a diagram visually illustrating a latency occurring in a processor and a dedicated accelerator.

FIG. 3 is a diagram illustrating internal components of the processor. FIGS. 3 and 4 illustrate a processor 300 implemented in the form of a board. For example, the processor 220 of the information processing system 110 may be implemented in the form of the processor 300 of FIGS. 3 and 4. As another example, the processor 220 of the information processing system 110 may include the processor 300 of FIGS. 3 and 4.

The processor 300 may include one or more processors 320 for pre-/post-data processing and a dedicated accelerator (e.g., a dedicated accelerator implemented as an ASIC) 340 for the machine learning model. For convenience of explanation, in FIGS. 3 and 4, one or more processors 320 for pre-/post-processing are referred to as the FPGA 320, and the dedicated accelerator 340 for the machine learning model is referred to as the NPU 340.

The FPGA 320 may include a data reception unit 322, a data pre-processing unit 324, and an order generation unit 326. Although the internal components of the processor are categorized by function and illustrated in FIG. 3, it should not be understood as meaning that they are physically separated. In addition, the internal configuration of the FPGA 320 illustrated in FIG. 3 is only an example, and it is not intended to depict essential configurations only.

The data reception unit 322 of the FPGA 320 may receive the market data from one or more stock exchanges (e.g., the first stock exchange, the second stock exchange, and the like). The one or more stock exchanges may include the target stock exchange. In this example, the target stock exchange is a destination of the transmitted order data, and may perform a security sell or buy based on the order data.

The market data may include data on items traded on the one or more stock exchanges. For example, the market data may include an order book of (at least some of) the items traded on the stock exchange, and additionally, the market data may include data on a target item. For example, the market data may include the top of an order book for the target item, a list of (valid) orders for the target item, a response of the target stock exchange to a previous order for the target item, and the like.

The data reception unit 322 may receive the market data from the stock exchange periodically or whenever it is necessary to update the market data. Meanwhile, if volatility in stock market or/and target securities is high, the frequency the market data is received may increase, and if the volatility in stock market or/and target securities is low, frequency the market data is received may decrease. For example, if the price volatility of the target item is high, the data reception unit 322 may receive the market data including the order book of the target item more frequently during unit time. On the other hand, if the price volatility of the target item is low, the data reception unit 322 may receive the market data including the order book of the target item less frequently during unit time.

Since it is important to process data at a high speed in high frequency trading, the market data may be received through a User Datagram Protocol (UDP) having a high data transmission rate. However, in some aspects, other communication protocols (e.g., TCP/IP) may be used to receive the market data as needed (e.g., to ensure reliability of the data).

The data pre-processing unit 324 may generate input data for the machine learning model based on the received one or more market data. The data pre-processing unit 324 may select from the market data one or more input features of one or more items and configure input data. For example, the data pre-processing unit 324 may include a feature extraction unit configured to extract or select the input features included in the input data.

One or more items included in the input data may include items that may be a leading indicator of the volatility of the target item in the market. For example, if the target item intended to be ordered is the stock (spot) of Company A, the input data may include data on futures stocks related to company A's stock, option stocks related to company A's stock, stocks related to company A included in other exchanges, futures stocks for products (e.g., crude oil, and the like) associated with company A, and the like. In addition, the one or more input features included in the input data may include information meaningful in predicting market conditions of the target item. For example, the input features may include various information extractable from the order book of one or more items, such as a market price (transaction price), a price and quantity at the top of the order book of a buying side, a price and quantity at the top of the order book of a selling side, the number of sellers wishing to sell, the ask price for buy of the next stage at the top of the order book, the ask price for sell of the next stage at the top of the order book, and the variance of the ask price included in the order book, and processed information thereof and/or reliability of the information. The configuration of the input data will be described below in detail with reference to FIG. 10.

The data pre-processing unit 324 may select one of a plurality of predetermined candidate batch sizes, and generate input data for the machine learning model so as to correspond to the selected candidate batch size. A list of candidate batch sizes including a plurality of different batch sizes may be generated in advance, and the data pre-processing unit 324 may select one batch size from the candidate batch size list. The data pre-processing unit 324 may calculate a latency for a market order and determine a batch size from the batch size list based on the calculated latency. A method for calculating a latency will be described below in detail with reference to FIGS. 4 and 5.

The input data generated by the data pre-processing unit 324 may be transferred to the NPU 340, which is a dedicated accelerator for the machine learning model, and input to the machine learning model (e.g., DNN). The NPU 340 may be implemented as an application specific integrated circuit (ASIC) specialized for driving a machine learning model. In response to inputting the input data to the machine learning model, the NPU 340 may acquire prediction data for the target item. For example, the NPU 340 may input the input data to the machine learning model and derive output data that predicts the price (e.g., market price) of the target item at one or more future time points. The machine learning model for deriving the output data associated with the order for the target item will be described in detail below with reference to FIGS. 9 to 11.

The order generation unit 326 may receive the prediction data output from the machine learning model and generate the order data on the target stock exchange based on the prediction data. For example, the order generation unit 326 may generate the order data for the target item according to a predetermined rule, based on price volatility prediction and/or price prediction of the target item at a future time point, which is inferred from the machine learning model. Specifically, if the price of the target item is predicted to increase, the order generation unit 326 may immediately generate a new buy order or correct ask price of an existing sell order. The order data may include information on the type of order (new order, order cancellation, order correction) for the target item, whether to buy or sell, price (ask price), quantity, and the like.

The latency can occur in the information processing system until the order data is generated based on the market data. The latency may be calculated based on data rate, bandwidth of input and output data between the FPGA 320 and the NPU 340, size of the input and output data, computation speed of the machine learning model by the NPU 340, processing speed of the FPGA 320, or/and busy state of the NPU 320.

As the batch size increases, the computation speed of the machine learning model may slow down, and if a large batch size is set without considering the latency, a time gap problem may occur in which the result of prediction for the future time point in the machine learning model is already in the past at the time of output. For example, if prediction data of a target security for future time point T1 is acquired at time T1+1 in response to inputting the input data corresponding to the first batch size to the machine learning model, the time T1 is already in the past at the time T1+1 of acquiring the prediction data. In this case, if the order data is generated based on the output data at the time T1, it is hard to anticipate the profit with the prediction result of the machine learning model.

Meanwhile, in order to reduce latency, a method of minimizing the batch size may also be considered. Meanwhile, the prediction accuracy of the machine learning model may decrease as the batch size decreases. Therefore, in order to increase the accuracy and anticipated profit, it may be advantageous to increase the batch size, but if the batch size is too large, the time gap problem may occur in which the data of future time point acquired from the machine learning model is already the past data. Accordingly, it may be important to accurately predict latency for a market order and determine the batch size with the highest anticipated profit (e.g., the largest possible batch size) from an acceptable range where there occurs no time gap. Accordingly, latency for the market order can be accurately calculated, and, based on the calculated latency, the batch size with the highest possible anticipated profit can be selected from a range where there occurs no time gap.

A method for calculating latency for a market order will be described with reference to FIGS. 4 and 5.

FIG. 4 is a diagram visually illustrating a latency occurring in a processor and a dedicated accelerator. As illustrated in FIG. 4, if the market data is received, a first sub latency t1 may occur in the FPGA 320 during which the market data is stored in a storage unit (e.g., a reception buffer, a memory, and the like). The first sub latency t1 may be calculated based on at least one of the data rate and the size of market data. For example, the higher the data rate, the shorter the first sub latency t1, and the larger the size of the market data, the longer the first sub latency t1.

Additionally, a second sub latency t2 may occur in the FPGA 320, which is a time delay taken until the stored market data is pre-processed and the input data is generated. The second sub latency t2 may be calculated based on the batch size or/and the processing speed of the FPGA 320. That is, when the batch size for the input data is selected from among a plurality of candidate batch sizes by the data pre-processing unit 324, the second sub latency t2 may occur until the input data corresponding to the selected batch size is generated by the data pre-processing unit 324. The larger the batch size is, the longer the second sub latency t2 may be. In addition, the slower the processing speed of the FPGA 320 is, the longer the second sub latency t2 may be.

A third sub latency t3 may occur in the NPU 340, which is a time delay taken until the input data is received and loaded into the memory. The third sub latency t3 may be calculated based on the size of input data or/and the input and output bandwidths between the FPGA 320 and the NPU 340. For example, the larger the input and output bandwidths are, the shorter the third sub latency t3 may be, and the larger the size of input data is, the longer the third sub latency t3 may be.

Additionally, a fourth sub latency t4 may occur in the NPU 340, which is a time delay until the machine learning model is computed based on the loaded input data. The fourth sub latency t4 may be calculated based on the computation speed of the machine learning model by the NPU 340 or/and the size of the input data. The larger the size of the input data is, the longer the fourth sub latency t4 may be, and the slower the computation speed of the machine learning model is, the longer the fourth sub latency t4 may be.

In addition, a fifth sub latency t5 may occur in the NPU 340, which is a time delay taken until the resultant value of the machine learning model (that is, the prediction data) is transmitted to the FPGA 320. The fifth sub latency t5 may be calculated based on the size of prediction data or/and the input and output bandwidths between the FPGA 320 and the NPU 340. For example, the larger the input and output bandwidths between the FPGA 320 and the NPU 340 are, the shorter the fifth sub latency t5 may be, and the larger the size of the prediction data is, the longer the fifth sub latency t5 may be.

A sixth sub latency t6 may occur in the FPGA 320, which is a time delay taken until order data is generated based on the prediction data (that is, the result value) of the machine learning model received from the NPU 340 and transmitted. The sixth sub latency t6 may be calculated based on the processing speed or/and data rate of the FPGA 320. The higher the data rate is, the shorter the sixth sub latency t6 may be, and the higher the processing speed of the FPGA 320 is, the shorter the sixth sub latency t6 may be.

A latency for a market order may be calculated by adding each of the sub latencies t1 to t6 described above.

Figure 5:
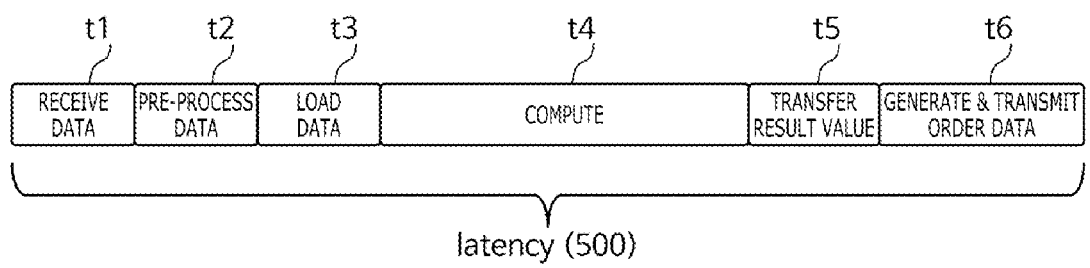
FIG. 5 is a diagram visually illustrating a latency for a market order.

FIG. 5 is a diagram visually illustrating a latency 500 for a market order. As illustrated, the latency 500 for the market order may be calculated by adding the sub latencies t1 to t6 generated in the FPGA 320 or/and the NPU 340.

Meanwhile, if the FPGA 320 is in busy state, a sub latency according to the busy state of the FPGA 320 may be added to the latency 500. In addition, if the NPU 340 is in busy state, the sub latency according to the busy state of the NPU 340 may be added to the latency 500. For example, the added sub latency according to the busy state of the FPGA 320 and/or NPU 340 may be determined in consideration of the current processing situation of the FPGA 320 and/or the NPU 340 and future tasks to be processed. As another example, the sub latency added according to the busy state of the FPGA 320 and/or the NPU 340 may be set in advance.

The machine learning model may output the prediction data for securities at a future time point based on the input data. Alternatively, the machine learning model may be designed and trained to predict different future time points based on the input data. In this case, a plurality of future time points based on the current time point may be determined in advance.

Figure 6:
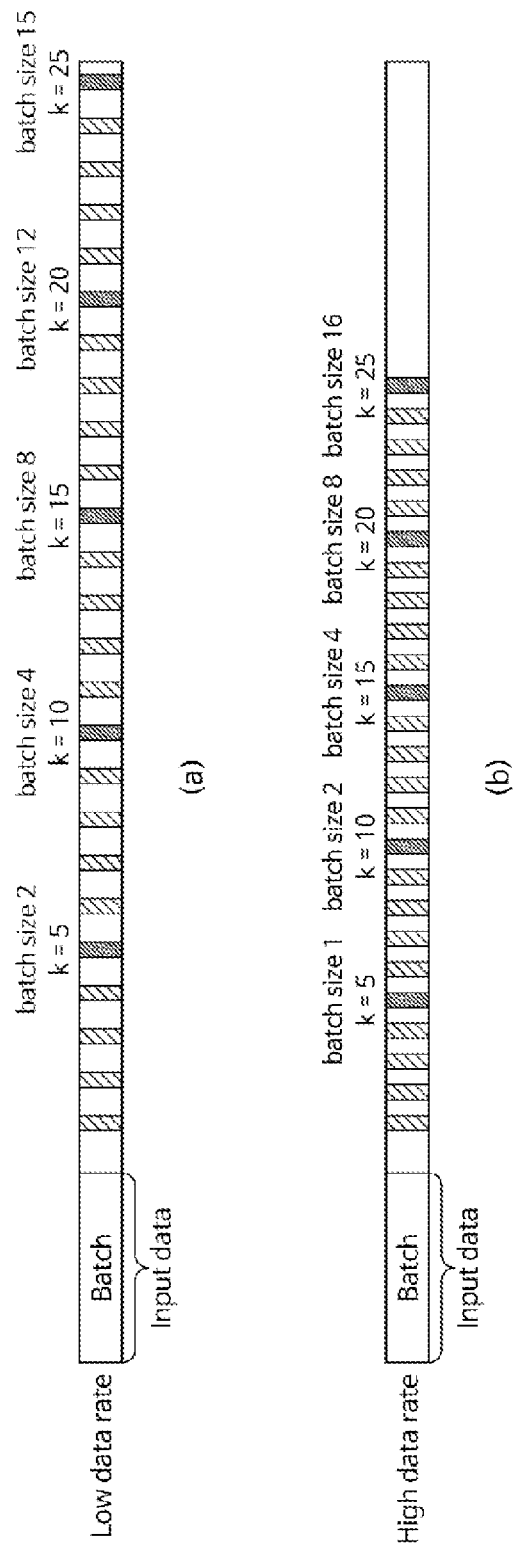
FIG. 6 is a diagram visually illustrating a plurality of future time points.

FIG. 6 is a diagram visually illustrating a plurality of future time points. A horizontal axis of FIG. 6 may represent time. In a low data rate environment as in FIG. 6A, the horizontal width of the unit time may be relatively long, and in a high data rate environment as in FIG. 6B, the horizontal width of the unit time may be relatively short.

As illustrated in FIG. 6, the machine learning model may be designed to predict the price and/or price volatility of the target item at future time points. FIG. 6 illustrates predicting future time points at time interval k by the multiples of 5. The processor (e.g., FPGA) may calculate a latency for the market order for each candidate batch size for each of the predetermined future time points, and select a candidate batch size for each future time point based on the calculated latency. In this case, for each of a plurality of predetermined future time points, the processor may select, from among the plurality of candidate batch sizes, the largest candidate batch size of which an end time point of the latency precedes each of the plurality of predetermined future time points. That is, the processor may identify, from among a plurality of candidate batch sizes selectable at a specific future time point, one or more candidate batch sizes of which the end time point of the latency precedes the specific future time point, and select, from among the identified candidate batch sizes, the largest candidate batch size as the candidate batch size of the specific future time point.

FIG. 6 illustrates that the maximum batch size is selected for each future time point. Referring to the example of FIG. 6, for the 5th (k=5) future time point, the candidate batch sizes of which the end time point of the latency precedes the 5th future time point are "1" and "2", and accordingly, "2", which is the maximum batch size, may be selected as the candidate batch size for the 5th (k=5) future time point. As another example, for the 10th (k=10) future time point, the candidate batch sizes of which the end time point of the latency precedes the 10th future time point are "4" and below, and accordingly, "4", which is the maximum batch size, may be selected as the candidate batch size for the 10th (k=10) future time point.

As described above, in order for the prediction data of the machine learning model for the k-th future time point to be used as the valid data, the order data based on the prediction data should be transmitted to the target stock exchange before the k-th future time point. However, if the latency for the market order is long, the transmission time point of the order data transmitted to the target stock exchange may be after the k-th future time point. In this case, the price for the predicted security item is not valid, and losses may occur, especially in the high frequency trading. Accordingly, it may be important in high frequency trading that a candidate batch size is selected based on the latency and future time point, and the input data corresponding to the selected batch size is generated.

Figure 7:
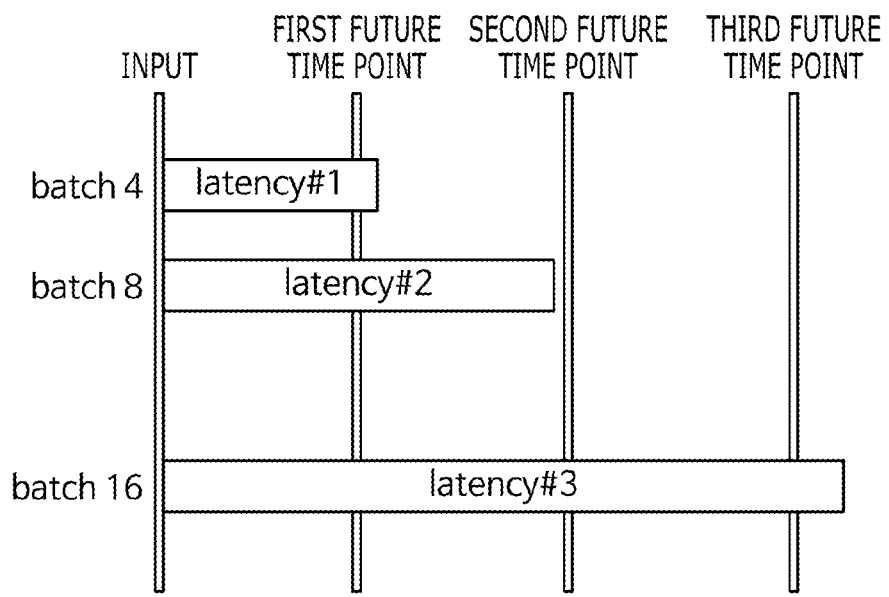
FIG. 7 is a diagram visually illustrating a latency calculated for each candidate batch size.

FIG. 7 is a diagram visually illustrating a latency calculated for each candidate batch size. As shown, the batch size increases from batch 4 to batch 16, and it may be a more distant future time point from the present time point as it progresses from the first future time point to the third future time point. As illustrated in FIG. 7, a plurality of latencies (latency #1 to latency #3) may be calculated based on each candidate batch size. However, if the input data corresponding to the size of batch 4 is generated with the end time point of the first latency (latency #1) being past the first future time point predicted based on batch 4, the generation time point of the order data based on the prediction data of the machine learning model may be after the first future time point. Likewise, if the input data corresponding to the size of batch 16 is generated with the end time point of the third latency (latency #3) being past the third end time point predicted based on batch 16, the generation time point of the order data based on the prediction data of the machine learning model may be after the third future time point. Due to this time gap, the input data corresponding to batch 4 or batch 16 may not derive valid results.

Meanwhile, if the input data corresponding to the size of batch 8 is generated with the end time point of the second latency (latency #2) being within the second future time point predicted based on batch 8 and, the output data of the machine learning model is valid, and the order data can be transmitted to the target stock exchange at a precise timing. Accordingly, if the latency is calculated as illustrated in FIG. 7, batch 8 corresponding to the maximum candidate batch size that does not cause a time gap can be selected, and input data corresponding to the selected candidate batch size may be generated and input to the machine learning model.

Meanwhile, the processor may include a plurality of dedicated accelerators. In this case, the processor may calculate the latency in consideration of the computation time of each of the plurality of dedicated accelerators, and select a candidate batch size and an NPU for computation of the machine learning model based on the latency.

Figure 8:
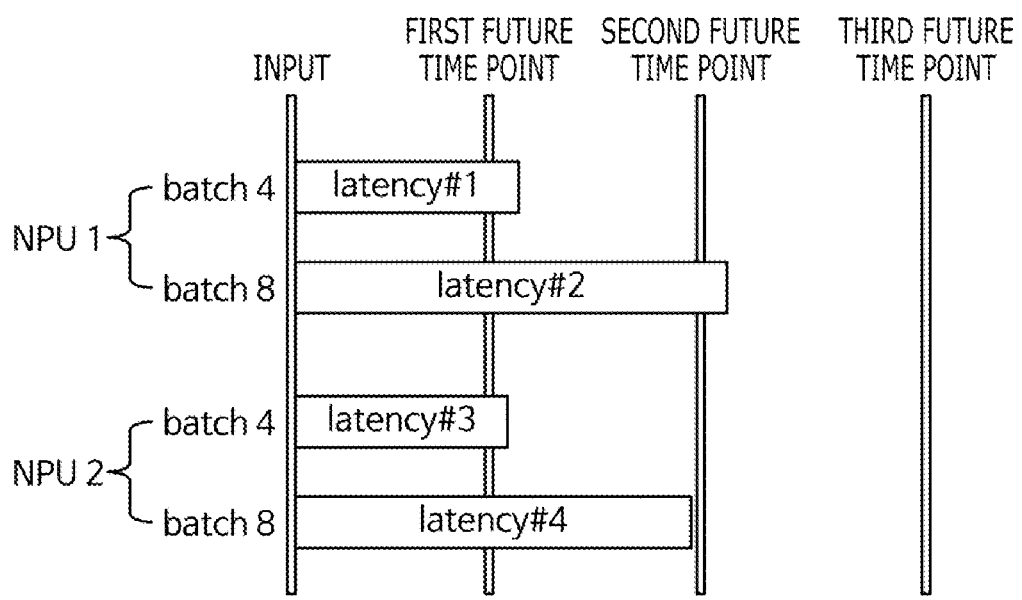
FIG. 8 is a diagram visually illustrating a latency calculated for each batch size of each dedicated accelerator.

FIG. 8 is a diagram visually illustrating a latency calculated for each batch size of each dedicated accelerator. As illustrated in FIG. 8, latencies (latency #1, latency #2) for each candidate batch size for a dedicated accelerator 1 (NPU 1) are calculated, and latencies (latency #3, latency #4) for each candidate batch size for a dedicated accelerator 2 (NPU 2) may be calculated. Note that different latencies may be calculated for each dedicated accelerator even for the same batch size, and this is because the computation speeds of the machine learning model by each dedicated accelerator or/and the busy state may be different from each other.

Based on the latency for each candidate batch size of each dedicated accelerator, the processor may select one dedicated accelerator for performing the machine learning computation, and a candidate batch size. If the latency is calculated as illustrated in FIG. 8, the processor may select a second dedicated accelerator (NPU 2) from among a plurality of dedicated accelerators as a dedicated accelerator for the computation of the machine learning model, and may also select batch 8 as a candidate batch size. If the candidate batch size and the dedicated accelerator are selected in this way, the input data corresponding to the candidate batch size may be generated based on the market data, and the generated input data may be provided to the selected dedicated accelerator (NPU 2).

Hereinafter, a method of training the machine learning model, and the prediction data acquired from the machine learning model will be described with reference to FIGS. 9 to 11.

Figure 9:
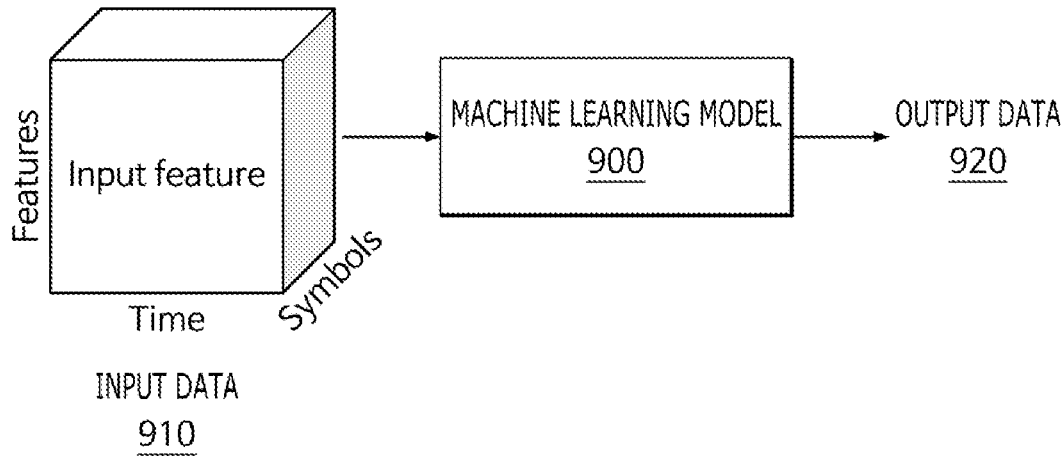
FIG. 9 is a diagram illustrating an example in which a machine learning model outputs output data based on input data.

FIG. 9 is a diagram illustrating an example in which the machine learning model outputs output data 920 based on input data 910. The machine learning model 900 may output the output data 920 associated with an order for the target item based on the input data 910. The machine learning model may output a predicted price (e.g., a market price or a median price) of the target item at a specific point in the future based on the input data 910. According to another example, the predicted prices of the target item at a plurality of future time points may be output based on the input data 910. The price of the target item at each of a plurality of future time points may be predicted based on multi-horizon predicting using the machine learning model 900.

The input data 910 input to the machine learning model 900 may include an input feature map including one or more input features for one or more items at one or more time points. The input data 910 of the machine learning model 900 will be described in detail below with reference to FIG. 10.

The machine learning model 900 may be trained to infer reference output data associated with the market orders on the target stock exchange, using reference input data generated based on reference market data. For example, the machine learning model 900 may be trained by supervised learning to infer the median price of the target item at the next time point based on input data in a time interval including a total of M consecutive time points, by using reference input data from time point (t) to time point (t+M−1) generated based on first reference market data of the first stock exchange and second reference market data of the second stock exchange, and median price data of the target item at time point (t+1).

The machine learning model 900 may be trained to infer prediction data for a specific item at a plurality of time points which are later than a specific time point, based on a training set including market data and ground truth data for the specific item at the specific time point. In this case, the ground truth data may be the price of the specific item at each of a plurality of time points. The difference (loss) between the inferred price for the specific item at the specific future time point output from the machine learning model 900 and the price for the specific item at the specific future time point included in the ground truth data may be calculated, and the calculated loss may be reflected (feedbacked) to the machine learning model 900, thereby adjusting the weight of each node included in the artificial neural network.

The output data 920 output by the machine learning model 900 may include information associated with a market order on the target stock exchange, and the processor (e.g., the processor of the information processing system) may generate order data for the target item based on a predetermined rule based on the output data 920.

The machine learning model 900 of the present disclosure may be an artificial neural network model (e.g., DNN and the like). The artificial neural network model will be described below in detail with reference to FIG. 11.

Figure 10:
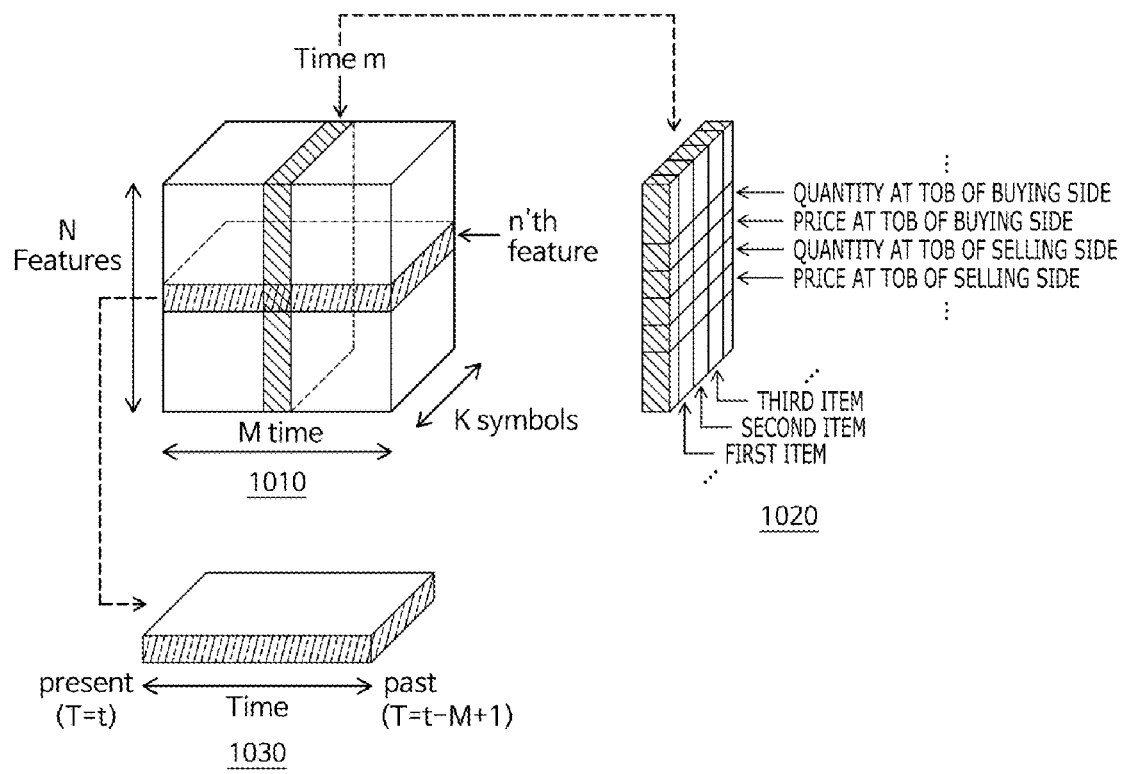
FIG. 10 is a diagram illustrating an example of a configuration of input data of a machine learning model.

FIG. 10 is a diagram illustrating an example of a configuration of input data 1010 of the machine learning model. The information processing system may generate the input data 1010 based on the market data received from one or more exchanges. The input data 1010 may be data having a size corresponding to the batch size. The input data 1010 may include an input feature map including one or more input features for one or more items at one or more time points.

For example, the input feature map may include N input features (where N is a natural number) for K items at M time points (where M is a natural number), as illustrated in FIG. 10. In the illustrated example, data 1020 at a specific time point (time (m) in FIG. 10) in an input feature map included in the input data may include one or more input features (the price and quantity at the top of the order book on the buying side, the price and quantity at the top of the order book on the selling side, and the like in FIG. 10) for one or more items (first item, second item, third item, and the like in FIG. 10) at a specific time point. In addition, data 1030 for a specific input feature (n-th input feature in FIG. 10) in the input feature map included in the input data may include specific input features for one or more items at one or more time points (from time point (t−M+1) to time point (t) in FIG. 10). The input feature map may be generated such that one or more input features for different items intersect each other.

The one or more items included in the input data 1010 may be items serving as a leading indicator of the market conditions of the target item to be ordered. For example, if the target item to be ordered is the company A's stock (spot), the item that serves as the leading indicator may be at least one of: futures stocks related to the company A's stock; option stocks related to the company A's stock; stocks related to the company A included in another exchange; and futures stocks for products related to the company A. The one or more items may include a target item. That is, the information processing system may predict the future market conditions of the target item based on the input data including the data on the target item. In addition, the information on each input item may be included as a code (symbol) associated with each input item.

The one or more input features included in the input data 1010 may include information meaningful in predicting market conditions of the target item. For example, the input features may include various information extractable from the order book of one or more items, such as a market price (transaction price), a price and quantity at the top of the order book of a buying side, a price and quantity at the top of the order book of a selling side, the number of sellers wishing to sell, the ask price for buy of the next stage at the top of the order book, the ask price for sell of the next stage at the top of the order book, and the variance of the ask price included in the order book, and processed information thereof and/or reliability of the information. The one or more input features may be extracted from each of one or more items.

The input data 1010 configured as described above may be transmitted to the dedicated accelerator for the machine learning model by the processor (e.g., FPGA or the like), and may be input to the machine learning model. The future time point and a candidate batch size may be determined based on the latency, and the input data 1010 corresponding to the determined candidate batch size may be provided to the dedicated accelerator.

Figure 11:
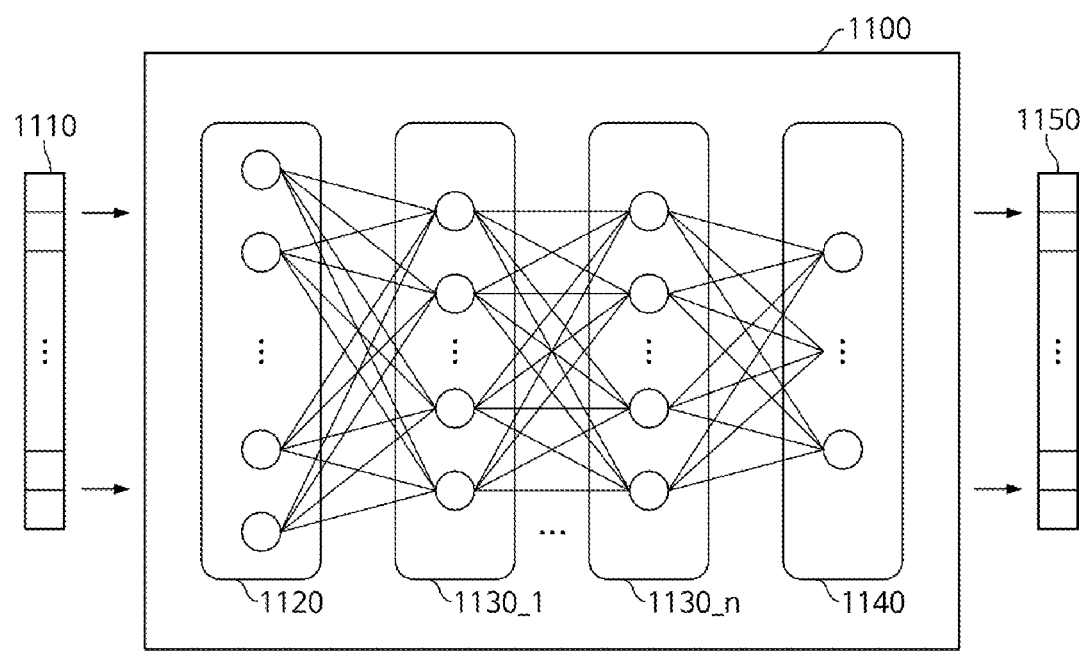
FIG. 11 illustrates an example of an artificial neural network model.

FIG. 11 illustrates an example of an artificial neural network model 1100. In machine learning technology and cognitive science, the artificial neural network model 1100 as an example of the machine learning model refers to a statistical learning algorithm implemented based on a structure of a biological neural network, or to a structure that executes such algorithm.

The artificial neural network model 1100 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, an artificial neural network model 1100 may include any probability model, neural network model, and the like, that is used in artificial intelligence learning methods such as machine learning and deep learning.

The neural network model 1100 may include an artificial neural network model configured to infer data (e.g., data about price, price volatility, and the like) associated with a market order in a target stock exchange at a time point in the future, using the input data generated based on the market data of one or more stock exchanges. According to another example, the artificial neural network model 1100 may also include a multi-horizon forecasting model to predict data (e.g., data about price, price volatility, and the like) associated with the market order on the target stock exchange at multiple future time points.

The artificial neural network model 1100 is implemented as a multilayer perceptron (MLP) formed of multiple nodes and connections between them. The artificial neural network model 1100 may be implemented using one of various artificial neural network model structures including the MLP. As illustrated in FIG. 11, the artificial neural network model 1100 includes an input layer 1120 to receive an input signal or data 1110 from the outside, an output layer 1140 to output an output signal or data 1150 corresponding to the input data, and (n) number of hidden layers 1130_1 to 1130_$n$ (where n is a positive integer) positioned between the input layer 1120 and the output layer 1140 to receive a signal from the input layer 1120, extract the features, and transmit the features to the output layer 1140. In an example, the output layer 1140 receives signals from the hidden layers 1130_1 to 1130_$n$ and outputs them to the outside.

The method of training the artificial neural network model 1100 includes the supervised learning that trains to optimize for solving a problem with inputs of teacher signals (correct answers), and the unsupervised learning that does not require a teacher signal. The neural network model 1100 may be trained by the supervised and/or unsupervised learning to infer the data associated with the market order in the target stock exchange. For example, the artificial neural network model 1100 may be trained by the supervised learning to infer the reference price of the target item at one or more future time points from the reference input data.

The artificial neural network model 1100 trained as described above may be stored in a memory (not illustrated) of the information processing system, and may infer the data associated with the market order in a target stock exchange in response to inputting the data received from the communication module and/or memory.

The input data of the artificial neural network model for inferring the data associated with the market order in the target stock exchange may include one or more input features for one or more items at one or more time points. For example, the input data input to the input layer 1120 of the artificial neural network model 1100 may be a vector 1110 in which data including information on one or more input features for one or more items at one or more time points is configured as one vector data element. In response to the input of data, output data output from the output layer 1140 of the artificial neural network model 1100 may be a vector 1150 representing or characterizing the data associated with the market order in the target stock exchange. That is, the output layer 1140 of the artificial neural network model 1100 may be configured to output a vector representing or characterizing the data associated with the market order in the target stock exchange at one or more future time points. In the present disclosure, the output data of the artificial neural network model 1100 is not limited to the types described above, and may include any information/data representing the data associated with the market order in the target stock exchange at one or more future time points.

As described above, the input layer 1120 and the output layer 1140 of the artificial neural network model 1100 are respectively matched with a plurality of output data corresponding to a plurality of input data, and the synaptic values between nodes included in the input layer 1120, and the hidden layers 1130_1 to 1130_n, and the output layer 1140 are adjusted, so that training can be processed to extract a correct output corresponding to a specific input. Through this training process, the features hidden in the input data of the artificial neural network model 1100 may be confirmed, and the synaptic values (or weights) between the nodes of the artificial neural network model 1100 may be adjusted so as to reduce the errors between the output data calculated based on the input data and the target output. The artificial neural network model 1100 trained as described above may output the data associated with the market order in the target stock exchange in response to the input data.

Hereinafter, a stock trading method using a machine learning model will be described with reference to FIGS. 12 to 14.

Figure 12:
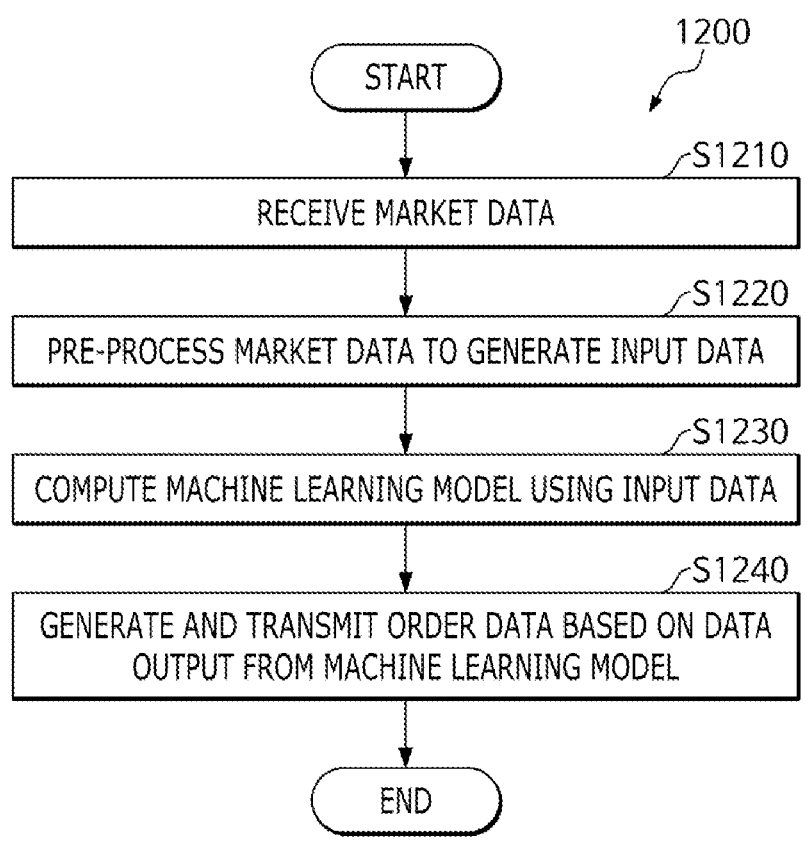
FIG. 12 is a flowchart illustrating a stock trading method.

FIG. 12 is a flowchart illustrating a stock trading method 1200. The method illustrated in FIG. 12 is merely one example for achieving the object of the present disclosure, and it goes without saying that certain steps may be added or deleted as needed. In addition, the method illustrated in FIG. 12 may be performed by one or more processors included in the information processing system. For convenience of description, it will be described that each step illustrated in FIG. 12 is performed by a processor included in the information processing system illustrated in FIG. 12. In addition, the processor will be described as including a first processor for data pre-/post-processing and a second processor including a dedicated accelerator for the machine learning model. In this case, the first processor may be an FPGA, and the second processor may be an NPU.

The first processor may receive one or more market data from at least one of a stock exchange and/or a designated website, at S1210. In this case, the market data may include information of transactions, evaluations, and the like on items traded on the stock exchange. For example, the market data may include information of transactions, evaluations, and the like on one or more target items collected from the stock exchange and/or the web site.

The first processor may pre-process the market data to generate input data for the machine learning model and provide the input data to the second processor, at S1220. A detailed method for generating the input data by pre-processing the market data will be described with reference to FIG. 12.

The second processor may perform computation of the machine learning model using the input data, acquire prediction data for the target item in response, and provide the acquired prediction data to the first processor, at S1230. For example, the second processor may receive the input data from the first processor, input the input data to the machine learning model, and perform a series of computations on the input data so as to acquire output data (prediction data) of the machine learning model. The prediction data from the machine learning model may include data on future time points, target items, and expected prices.

The first processor may generate order data based on the output data (prediction data) of the machine learning model received from the second processor and transmit the order data to the target stock exchange, at S1240. For example, the first processor may generate the order data for buying or selling the target item included in the prediction data. The first processor may monitor whether or not the future time point included in the prediction data arrives, and transmit the order data generated at the future time point or at a time point t seconds ahead of the future time point to the target stock exchange. As another example, the first processor may monitor whether or not the future time point included in the prediction data arrives, generate the order data at the future time point or at a time point t seconds ahead of the future time point, and transmit the generated order data to the target stock exchange.

Figure 13:
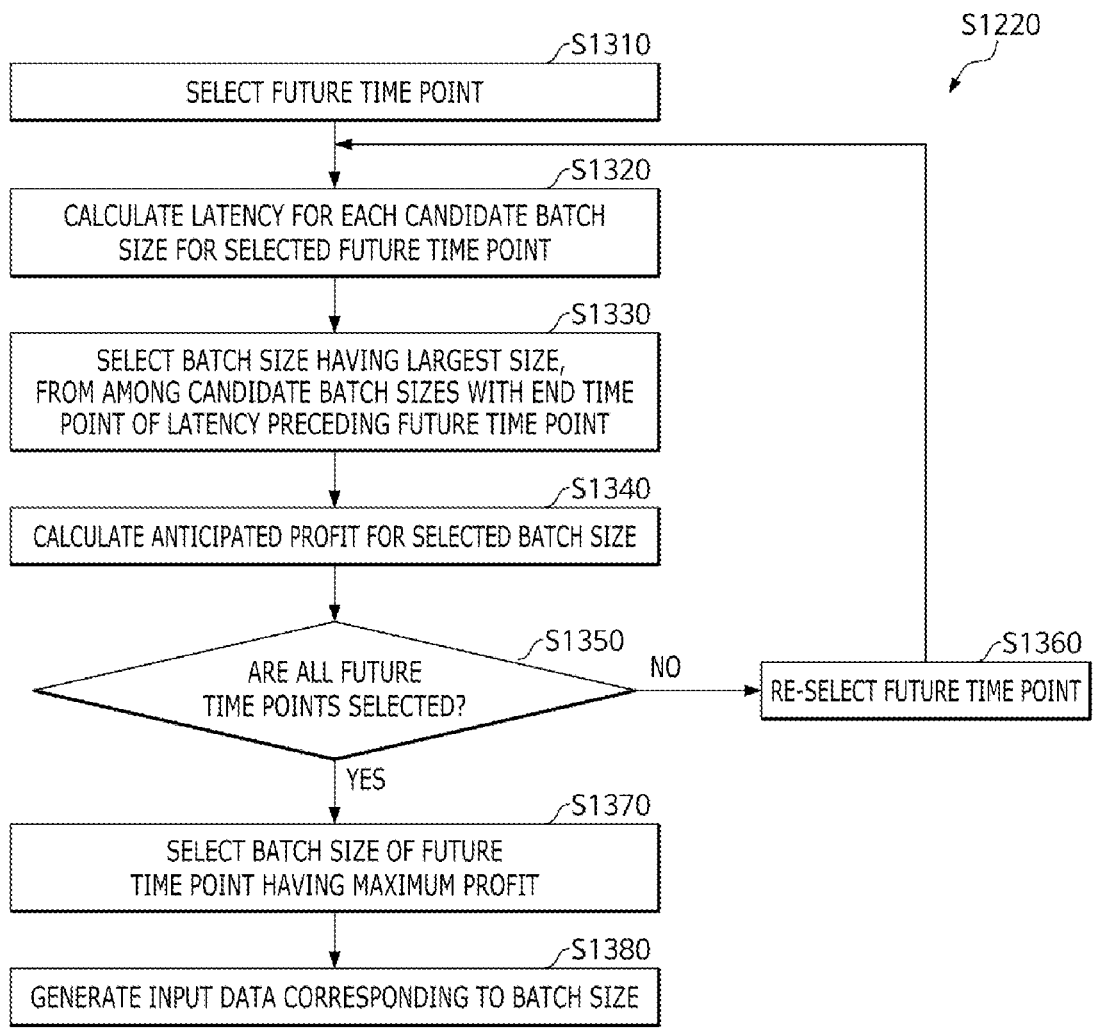
FIG. 13 is a flowchart illustrating a method for pre-processing market data.

FIG. 13 is a flowchart illustrating a method 1220 for pre-processing the market data. If the market data is received, the first processor may select one future time point for verification from among a plurality of predetermined future time points, at S1310. The first processor may select the closest future time point that is not selected from among a plurality of predetermined future time points.

The first processor may calculate a latency for each candidate batch size for the selected future time point, at S1320. The first processor may calculate a latency for each of the candidate batch sizes based on the data rate, bandwidths of the input and output data between the first and second processors, sizes of the input and output data, computation speed of the machine learning model by the second processor, processing speed of the first processor, or/and busy state of the second processor.

The first processor may identify one or more candidate batch sizes of which the end time point of the calculated latency precedes the selected future time point, and select a batch size having the largest size from among the identified candidate batch sizes as a candidate batch size of the selected (that is, currently verifying) future time point, at S1330. Accordingly, one candidate batch size may be selected at one future time point.

If the candidate batch size for the selected future time point is selected, the first processor may calculate an anticipated profit for the selected batch size for the future time point, at S1340. In this case, the anticipated profit may be a profit per unit time anticipated to be gained until the order data is generated. The anticipated profit may be acquired based on the profit per query, the candidate batch size, and the computation time of the machine learning model for the candidate batch size. For example, the anticipated profit may be acquired through Equation 1 below.

$$\text{profit} = \frac{(\text{price} \times bs)}{t\_dnn} \quad \langle \text{Equation 1} \rangle$$

where, "price" represents a profit per query and may be defined as a predetermined constant. In addition, "bs" represents a batch size, and "t_dnn" is the computation time in the machine learning model, which may be calculated based on the computation speed of the machine learning model (that is, the processing speed in the NPU) or/and the size of the input data.

If the computation of the anticipated profit for the candidate batch size of the future time point is completed, the first processor may determine whether or not selection (verification) of all the predetermined future time points is completed, at S1350.

In response to determining that there remains a non-selected (non-verified) future time point among a plurality of predetermined future time points, the first processor may select the non-selected (non-verified) future time point for its verification again, at S1360. The first processor may start from S1320 and perform the corresponding processes with respect to another future time point selected for verification purpose.

On the other hand, in response to determining, as a result of the determination at S1350, that there is no future time point of the predetermined future time points that is not selected (verified), the first processor may identify the anticipated profit of the candidate batch size selected at each future time point, and the candidate batch size of the future time point having the maximum profit may be finally selected from among the anticipated profits, at S1370. The first processor may generate input data corresponding to the candidate batch size of the selected future time point using the market data, and provide the generated input data to the second processor, at S1380.

By ensuring that a batch size that causes a time gap is not selected, it is possible to prevent unnecessary computations from being performed in the machine learning model. In addition, a future time point and a candidate batch size that can achieve maximum profit may be selected, and the input data corresponding to the selected candidate batch size may be input to the machine learning model.

Additionally or alternatively, data precision of the input data may be set in advance, in which case the first processor may calculate a latency based on the data precision of the input data. In this case, the data precision may represent a measure by which input data can be preserved without being lost. For example, if the data precision is 100%, it may mean that the input data is completely provided to the second processor without loss and input to the machine learning model. As another example, if the data precision is 50%, it may mean that the input data is quantized to ½ bits (e.g., from int8 to int4) or compressed two times and input to the machine learning model. As yet another example, if the data precision is 50%, it may mean that the data is quantized to ½ bits or the market data is compressed two times, and input data is generated based on the quantized or compressed market data.

The second processor (e.g., NPU, and the like) may include processing elements having different sizes according to the data precision of the input data. For example, an NPU for processing the input data having fixed point 8 may include a processing element for processing the fixed point 8. As another example, an NPU for processing the input data having a fixed point 4 may include a processing element for processing the fixed point 4. Note that the size of the processing element for processing the fixed point 8 may be approximately twice as large as the size of the processing element for processing the fixed point 4. Accordingly, if the NPUs are installed in the same space, the number of processing elements for processing the fixed point 4 may be about twice as large as the processing elements for processing the fixed point 8. For example, if the number of processing elements for processing the fixed point 8 (e.g., with the data precision of 100%) is twice as large as the number of processing elements for processing the fixed point 4 (e.g., with the data precision of 50%), the batch size of the input data input to the NPU including the processing element for processing the fixed point 4 may be doubled. In this case, the NPU including the processing element for processing the fixed point 8 and the NPU including the processing element for processing the fixed point 4 may have the same or similar size SRAM required for the computation and time taken for the computation.

If the data precision of the input data decreases, the input data is not completely input to the machine learning model, and some loss may occur. Accordingly, the prediction accuracy may decrease, but since there are more processing elements for processing the input data having low data precision, the batch size of input data may be increased. That is, the decreasing prediction accuracy according to the decreasing data precision may influence the profit per query such that it may decrease, but the increasing batch size according to the decreasing data precision may influence the anticipated profit such that it may increase. Referring to Equation 1 above, the anticipated profit may be decreased as much as the profit per query is decreased, but may be increased as much as the batch size is increased. For example, when it is assumed that the profit per query is decreased by 50% and the batch size is doubled due to the data precision being halved, the anticipated profit may not change.

A plurality of dedicated accelerators may be included in the information processing system. In this case, the first processor may calculate, for each of the plurality of candidate batch sizes, a first latency including a computation time of the first dedicated accelerator, and a second latency including a computation time of the second dedicated accelerator. In addition, for each of a plurality of predetermined future time points, the first processor may select the largest candidate batch size of which an end time point of a lower latency of the first and second latencies precedes each of the plurality of predetermined future time points. In addition, the first processor may calculate the anticipated profits for the candidate batch sizes respectively selected for each of the dedicated accelerators, and identify and select a candidate batch size with the highest anticipated profit, a future time point, and a dedicated accelerator. The input data generated corresponding to the candidate batch size with the highest anticipated profit may be provided to the selected dedicated accelerator (dedicated accelerator for which the maximum profit is predicted).

Meanwhile, according to another example, the machine learning model may output the prediction data of the target item for each of a plurality of future time points. For example, the machine learning model may output first prediction data for the target item at a first time point, second prediction data for the target item at a second time point, and third prediction data for the target item at a third time point. The prediction data may include target security identification information, target price, and anticipated profit.

Figure 14:
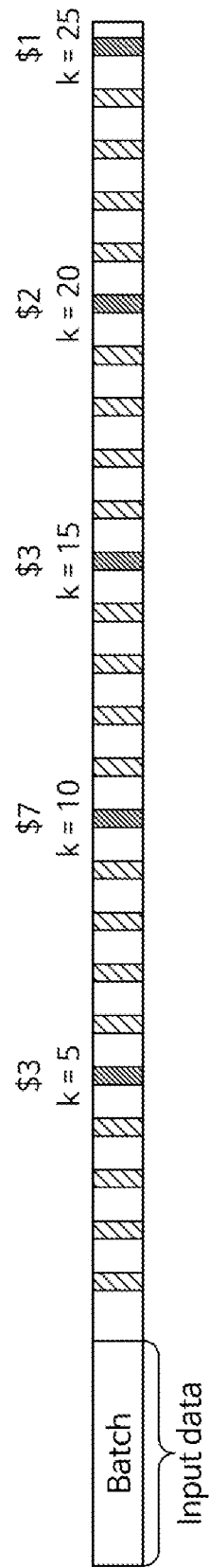
FIG. 14 is a diagram illustrating an example of anticipated profits for each of a plurality of future time points.

FIG. 14 is a diagram illustrating an example of the anticipated profits for each of a plurality of future time points. As illustrated in FIG. 14, the machine learning model may infer the anticipated profit for each of a plurality of future time points based on the input data, and output the prediction data including the anticipated profit for each future time point and the target item. In this case, the target items at each future time point may be the same as or different from each other. In FIG. 14, the anticipated profits are presented in units of United States Dollars (USD).

The first processor may acquire the prediction data including the anticipated profit for each of a plurality of future time points as illustrated in FIG. 14, generate order data based on the prediction data, and transmit the generated order data to the target stock exchange.

Figure 15:
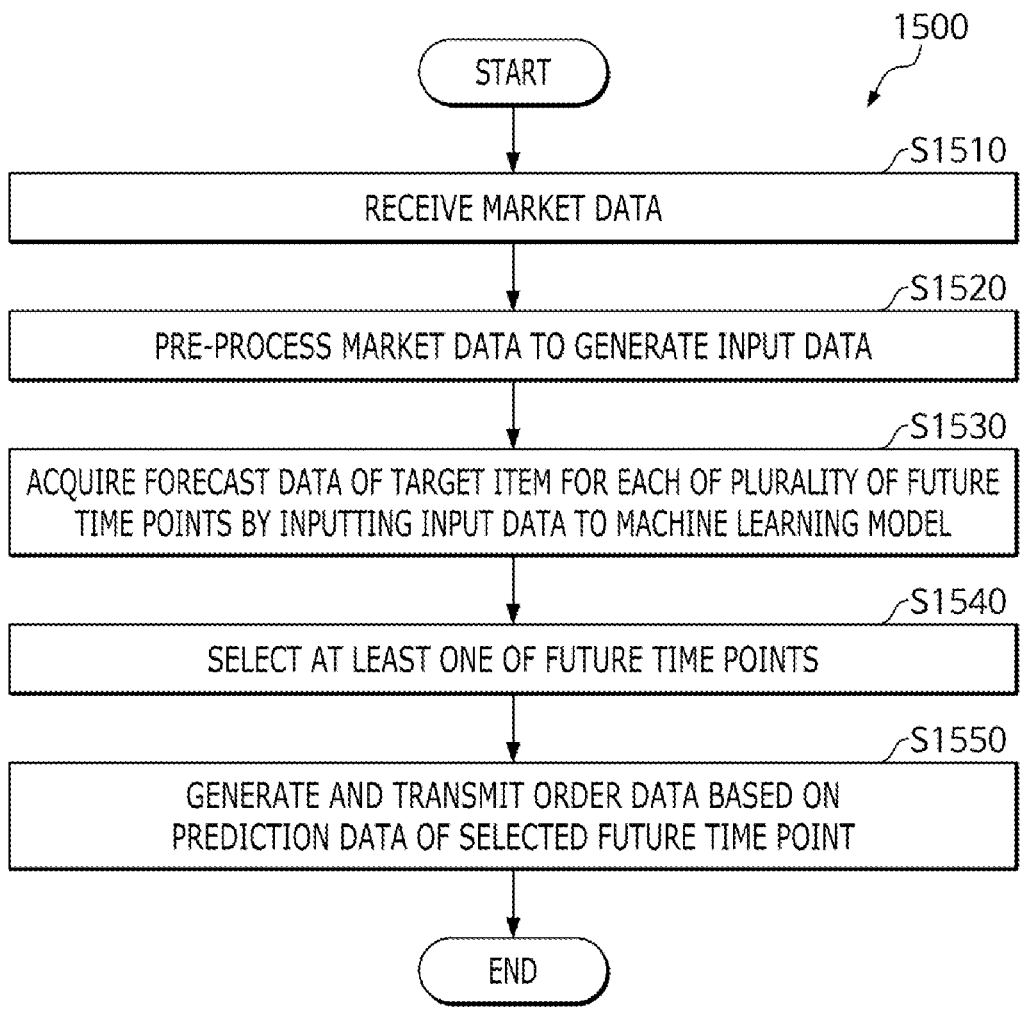
FIG. 15 is a flowchart provided to explain a stock trading method according to another example.

FIG. 15 is a flowchart illustrating a stock trading method 1500 according to another example. The method illustrated in FIG. 15 is merely one example for achieving the object of the present disclosure, and it goes without saying that certain steps may be added or deleted as needed. In addition, the method illustrated in FIG. 15 may be performed by one or more processors included in the information processing system. In addition, the processor will be described as including the first processor for data pre-/post-processing and the second processor including the dedicated accelerator for the machine learning model. In this case, the first processor may be an FPGA, and the second processor may be an NPU.

The first processor may receive one or more market data from the stock exchange and/or website, at S1510. In this case, the market data may include information of transactions, evaluations, and the like on items traded on the stock exchange. For example, the market data may include information of transactions, evaluations, and the like on one or more target items collected from the stock exchange and/or the website.

The first processor may generate input data for the machine learning model based on the market data and provide the input data to the dedicated accelerator, at S1520. For example, the first processor may generate the input data corresponding to a preset batch size. As another example, the first processor may determine a batch size according to the frequency and/or size of the received market data and generate the input data corresponding to the batch size.

The second processor may input the input data to the machine learning model, and acquire, from the machine learning model, the prediction data of the target item for each of a plurality of future time points, at S1530. For example, the second processor may acquire, from the machine learning model, the first prediction data for the target item at the first time point, the second prediction data for the target item at the second time point, and the third prediction data for the target item at the third time point. The prediction data may include the anticipated profit for the target item for each future time point.

The first processor may receive the prediction data for each of a plurality of future time points from the second processor, and select at least one of the plurality of future time points, at S1540. The first processor may calculate a latency for order data generation, and select, based on the latency, at least one future time point from among a plurality of future time points. For example, the first processor may select the earliest future time point after the latency, from among a plurality of future time points. As another example, the first processor may identify one or more future time points after the latency, identify or calculate anticipated profits for each of the identified future time points, and select a future time point with a maximum anticipated profit. For example, calculating the anticipated profit may be performed based on a predetermined algorithm or equation (e.g., Equation 1 above). As another example, each anticipated profit may be calculated and output from the machine learning model. In this case, the anticipated profit may be included in the prediction data.

The first processor may generate the order data based on the prediction data of the selected future time point and transmit the order data to the target stock exchange, at S1550. For example, the first processor may generate order data for buying or selling the target item included in the prediction data for the selected future time point at a target price. The first processor may monitor whether or not the selected future time point arrives, and transmit the order data generated at the future time point or a time point t seconds ahead of the future time point to the target stock exchange. As another example, the first processor may monitor whether or not the selected future time point arrives, generate the order data at the future time point or a time point t seconds ahead of the future time point, and transmit the generated order data to the target stock exchange.

Figure 16:
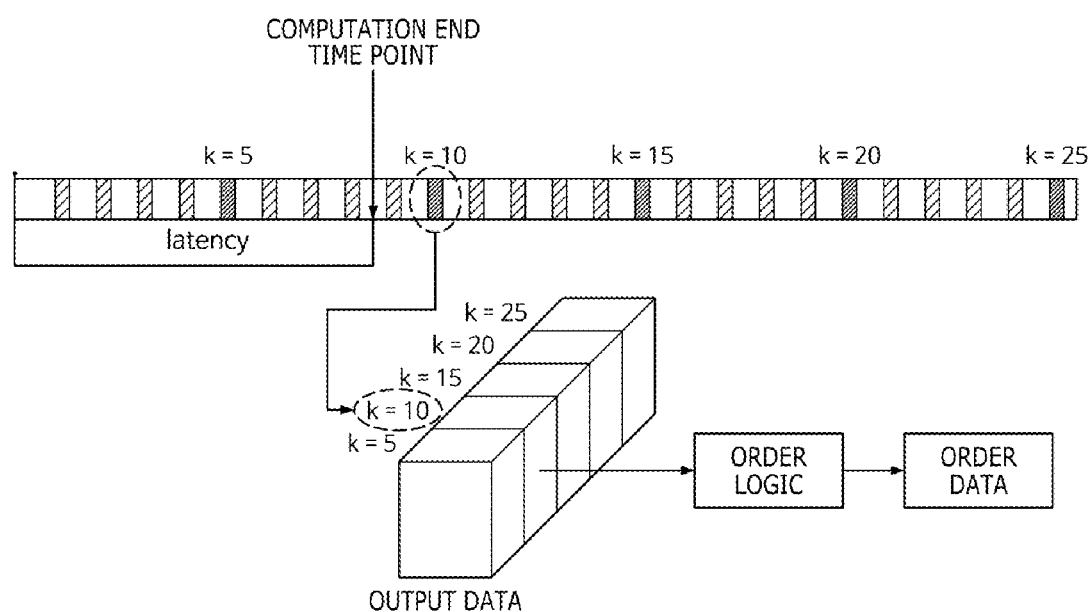
FIG. 16 is a diagram illustrating, by way of example, a process of generating order data based on output data.

FIG. 16 is a diagram illustrating, by way of example, a process of generating the order data based on the output data. The prediction data for a plurality of future time points (k=5, k=10, . . . , k=25) may be acquired through the machine learning model. Due to a latency, one of the prediction data that has the earliest future time point (k=5) may deviate from the latency range and be treated as invalid. The second prediction data (the encircled prediction data in FIG. 16) having the earliest future time point (k=10) among the remaining valid prediction data (that is, whose end time point of latency precedes the future time point) may be selected, and ordering logic may be executed based on the selected second prediction data to generate the order data. As another example, a future time point with the maximum anticipated profit may be selected from among the remaining valid prediction data, and ordering logic may be executed based on the prediction data for the selected future time point to generate the order data.

As still another example, the first processor may generate a plurality of order data sequentially using each valid prediction data according to time order and transmit the order data to the target stock exchange. Referring to the example of FIG. 16, the first processor may transmit second order data generated based on the second prediction data to the target stock exchange at a second future time point (k=10), transmit third order data generated based on the third prediction data to the target stock exchange at a third future time point (k=15), transmit fourth order data generated based on the fourth prediction data to the target stock exchange at a fourth future time point (k=20), and transmit fifth order data generated based on the fifth prediction data to the target stock exchange at a fifth future time point (k=25).

Figure 17:
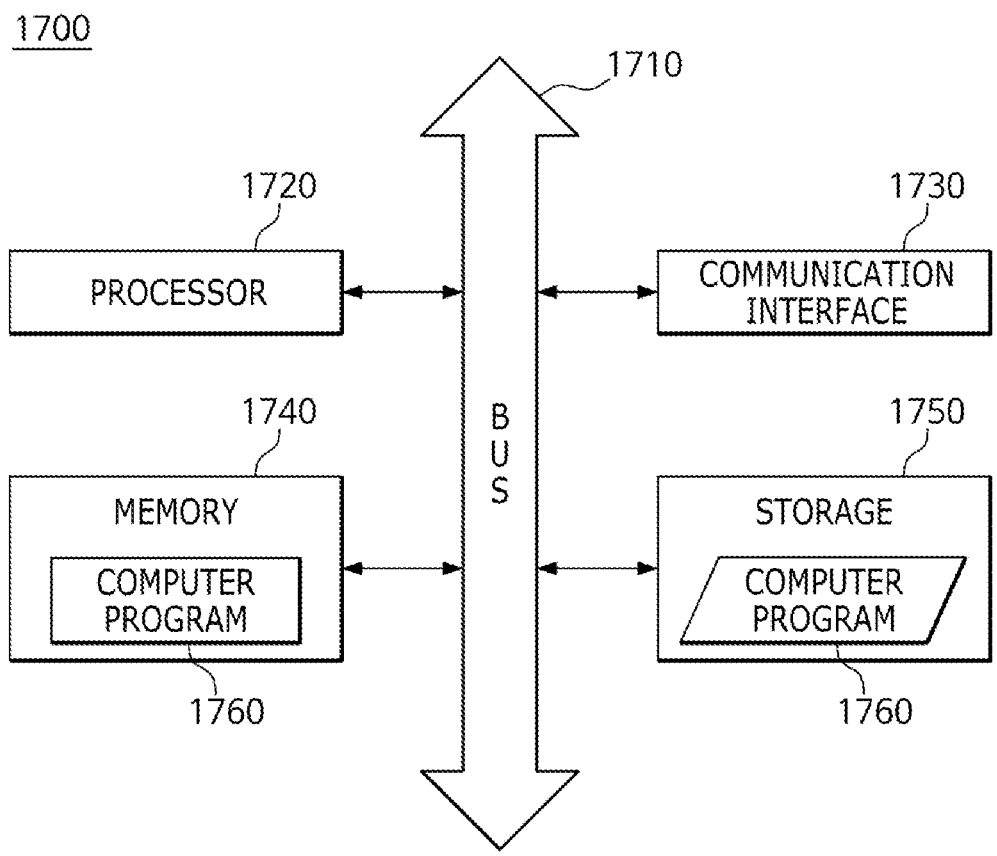
FIG. 17 illustrates a configuration of any computing device associated with the stock trade generation.

FIG. 17 illustrates a configuration of any computing device 1700 associated with the stock trade generation. For example, the computing device 1700 may include an information processing system 120 and/or a user terminal (not illustrated). As illustrated, the computing device 1700 may include one or more processors 1720, a bus 1710, a communication interface 1730, a memory 1740 for loading a computer program 1760 for execution by the processors 1720, and a storage 1750 for storing the computer program 1760. Meanwhile, only the components related to the present example are illustrated in FIG. 17. Accordingly, those of ordinary skill in the art to which the present disclosure pertains will be able to recognize that other general-purpose components may be further included in addition to the components illustrated in FIG. 17.

The processors 1720 control the overall operation of each component of the computing device 1700. The processor

1720 may include central processing unit (CPU), microprocessor unit (MPU), micro controller unit (MCU), graphic processing unit (GPU), neural processing unit (NPU), or any type of processor well known in the technical field of the present disclosure. In addition, the processor 1720 may perform an arithmetic operation on at least one application or program for executing the method according to various examples. The computing device 1700 may include one or more processors. For example, the computing device 1700 may include a processor implemented in an FPGA, and a dedicated accelerator for a machine learning model implemented in an ASIC (NPU ASIC).

The memory 1740 may store various types of data, instructions, and/or information. The memory 1740 may load one or more computer programs 1760 from the storage 1750 so as to execute the method/operation according to various examples of the present disclosure. The memory 1740 may be implemented as a volatile memory such as RAM, but the technical scope of the present disclosure is not limited thereto. If the computing device 1700 includes a plurality of processors, the computing device 1700 may include a first memory for the first processor and a second memory for the second processor. In this case, the first processor may execute the one or more instructions stored in the first memory so as to perform the data pre-processing and/or post-processing described above. The second processor may execute the one or more instructions stored in the second memory so as to perform computation of the machine learning model and provide the prediction data to the first processor.

The bus 1710 may provide a communication function between components of the computing device 1700. The bus 1710 may be implemented as various types of buses such as an address bus, a data bus, a control bus, or the like.

The communication interface 1730 may support wired/wireless Internet communication of the computing device 1700. In addition, the communication interface 1730 may support various other communication methods in addition to the Internet communication. To this end, the communication interface 1730 may include a communication module well known in the technical field of the present disclosure.

The storage 1750 may non-temporarily store one or more computer programs 1760. The storage 1750 may include a nonvolatile memory such as a read only memory (ROM), an erasable programmable ROM (EPROM), an electrically erasable programmable ROM (EEPROM), a flash memory, and the like, a hard disk, a detachable disk, or any type of computer-readable recording medium well known in the art to which the present disclosure pertains.

The computer program 1760 may include one or more instructions that, if loaded into the memory 1740, cause the processors 1720 to perform an operation/method in accordance with various embodiments of the present disclosure. That is, the processors 1720 may execute the one or more instructions so as to perform operations/methods according to various examples.

The flowchart and description described above are merely examples, and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

If implemented in software, the techniques described above may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a web site, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for high frequency trading, wherein the method is performed by one or more processors comprising a first processor for pre-processing and a second processor for a machine learning model and the first processor and the second processor are separate hardware, the method comprising:
receiving market data for a target item during a first unit time;
calculating a latency for a market order for each of a plurality of candidate batch sizes;
selecting a batch size from among the plurality of candidate batch sizes based on the calculated latency;
generating, by the first processor, input data corresponding to the selected batch size using market data for the target item;
transmitting, by the first processor, the input data to the second processor;
receiving, by the second processor, the input data;
generating, by the second processor, using the machine learning model, prediction data for the target item at a future time point, in the future time of the first unit time, associated with the selected batch size, based on the generated input data; and
generating order data for the target item based on the generated prediction data.

2. The method of claim 1, wherein the selecting the batch size includes, for each of a plurality of predetermined future time points, selecting, from among the plurality of candidate batch sizes, a largest candidate batch size of which an end time point of the calculated latency precedes each of the plurality of predetermined future time points.

3. The method of claim 2, wherein the selecting the batch size includes:
calculating an anticipated profit for each of selected batch sizes for each of the plurality of predetermined future time points; and
selecting a batch size having the highest calculated anticipated profit form among the selected batch sizes for each of the plurality of predetermined future time points.

4. The method of claim 3, wherein the calculating the anticipated profit includes, for each of the plurality of predetermined future time points, calculating an anticipated profit of each of the selected batch sizes based on each of the selected batch sizes, a profit per query, and a computation time of the machine learning model for each of the selected batch sizes.

5. The method of claim 1, wherein the calculating the latency includes, for each of the plurality of candidate batch sizes, calculating the latency based on at least one of a data rate, bandwidths of input and output data between the first processor and the second processor, sizes of the input and output data, a computation speed of the machine learning model by the second processor, a processing speed of the first processor, or a busy state of the second processor.

6. The method of claim 5, wherein the latency includes a time taken for the market data to be pre-processed by the first processor, a time taken for transferring the pre-processed data from the first processor to the second processor, a time taken for computation of the machine learning model to be completed by the second processor, a time taken for a computation result to be transferred from the second processor to the first processor, and a time taken for the order data to be generated based on the computation result by the first processor.

7. The method of claim 1, further comprising acquiring data precision of the input data, and
wherein the calculating the latency includes calculating, for each of the plurality of candidate batch sizes, a latency based on the precision of the input data.

8. The method of claim 7, wherein the latency is calculated based on processing elements that are increased as the precision of the input data is decreased.

9. The method of claim 7, wherein the selecting the batch size includes selecting a batch size from among the plurality of candidate batch sizes based on the acquired data precision of the input data.

10. The method of claim 9, wherein the batch size is selected based on processing elements that are increased as the precision of the input data is decreased.

11. The method of claim 1, wherein the second processor includes first and second dedicated accelerators for processing computation of the machine learning model,
the calculating the latency includes calculating, for each of the plurality of candidate batch sizes, a first latency including a computation time of the first dedicated accelerator and a second latency including a computation time of the second dedicated accelerator, and
the selecting the batch size includes selecting, for each of a plurality of predetermined future time points, a largest candidate batch size of which an end time point of a lower latency of the calculated first and second latencies precedes each of the plurality of predetermined future time points.

12. A non-transitory computer-readable recording medium storing instructions that, when executed by one or more processors, cause performance of the method according to claim 1.

13. A high frequency trading system, comprising:
a first memory storing one or more instructions;
one or more processors comprising a first processor for pre-processing and a second processor for a machine learning model and the first processor and the second processor are separate hardware, the one or more processors configured to, by executing the one or more instructions in the first memory, receive market data for a target item during a first unit time, calculate a latency for a market order for each of a plurality of candidate batch sizes, select a batch size from among the plurality of candidate batch sizes based on the calculated latency, and generate, by the first processor, input data corresponding to the selected batch size using market data for the target item, transmit, by the first processor, the input data to the second processor;
a second memory storing one or more instructions; and
the second processor configured to, by executing the one or more instructions in the second memory, receive the input data, generate, using the machine learning model, prediction data for the target item at a future time point associated with the selected batch size based on the generated input data, and provide the generated prediction data to the one or more processors,
wherein the one or more processors are further configured to generate order data for the target item based on the prediction data provided from the second processor.

14. The high frequency trading system of claim 13, wherein the calculating the latency includes, for each of the plurality of candidate batch sizes, calculating the latency based on at least one of a data rate, bandwidths of input and output data between the first processor and the second processor, sizes of the input and output data, a computation speed of the machine learning model by the second processor, a processing speed of the first processor, or a busy state of the second processor.

15. The high frequency trading system of claim 14, wherein the latency includes a time taken for the market data to be pre-processed by the first processor, a time taken for transferring the pre-processed data from the first processor to the second processor, a time taken for computation of the machine learning model to be completed by the second processor, a time taken for a computation result to be transferred from the second processor to the first processor, and a time taken for the order data to be generated based on the computation result by the first processor.

16. The high frequency trading system of claim 13, wherein the one or more processors are further configured to acquire data precision of the input data, and
the calculating the latency includes calculating, for each of the plurality of candidate batch sizes, a latency based on the precision of the input data.

17. The high frequency trading system of claim 16, wherein the latency is calculated based on processing elements that are increased as the data precision of the input data is decreased.

18. The high frequency trading system of claim 16, wherein the selecting the batch size includes selecting a batch size from among the plurality of candidate batch sizes based on the acquired data precision of the input data.

19. The high frequency trading system of claim 18, wherein the batch size is selected based on processing elements that are increased as the precision of the input data is decreased.

20. The high frequency trading system of claim 13, wherein the second processor includes first and second dedicated accelerators for processing computation of the machine learning model,
the calculating the latency includes calculating, for each of the plurality of candidate batch sizes, a first latency including a computation time of the first dedicated accelerator and a second latency including a computation time of the second dedicated accelerator, and
the selecting the batch size includes selecting, for each of a plurality of predetermined future time points, a largest candidate batch size of which an end time point of a lower latency of the calculated first and second latencies precedes each of the plurality of predetermined future time points.

* * * * *